United States Patent
Yamada et al.

(10) Patent No.: US 7,383,374 B2
(45) Date of Patent: Jun. 3, 2008

(54) METHOD AND APPARATUS FOR MANAGING VIRTUAL ADDRESSES

(75) Inventors: Koichi Yamada, Los Gatos, CA (US); Felix Leung, San Jose, CA (US); Amy Santoni, Austin, TX (US); Asit Mallick, Santa Clara, CA (US); Rohit Seth, Santa Clara, CA (US); Gary Hammond, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 11/096,175

(22) Filed: Mar. 31, 2005

(65) Prior Publication Data

US 2006/0224816 A1 Oct. 5, 2006

(51) Int. Cl.
*G06F 12/00* (2006.01)

(52) U.S. Cl. .......................................... 711/6; 711/207

(58) Field of Classification Search .................... 711/6
See application file for complete search history.

(56) References Cited

U.S. PATENT DOCUMENTS

| | | | | |
|---|---|---|---|---|
| 5,295,251 A * | 3/1994 | Wakui et al. | ............... | 718/100 |
| 6,430,670 B1 * | 8/2002 | Bryg et al. | ................. | 711/216 |
| 6,604,184 B2 * | 8/2003 | Zahir et al. | ................. | 711/207 |
| 7,089,377 B1 * | 8/2006 | Chen | .......................... | 711/147 |
| 2004/0064668 A1 * | 4/2004 | Kjos et al. | .................. | 711/202 |
| 2007/0011486 A1 * | 1/2007 | Li et al. | ........................ | 714/5 |

* cited by examiner

*Primary Examiner*—Reginald G. Bragdon
*Assistant Examiner*—Aracelis Ruiz
(74) *Attorney, Agent, or Firm*—L. Cho

(57) ABSTRACT

A method for managing virtual memory addresses includes associating a guest identifier (ID) with a virtual machine accessing a virtual memory address. A physical memory address is retrieved corresponding to the virtual memory address utilizing the guest ID. Other embodiments are described and claimed.

28 Claims, 7 Drawing Sheets

METHOD AND APPARATUS FOR MANAGING VIRTUAL ADDRESSES

FIELD

An embodiment of the present invention relates to virtualization. More specifically, an embodiment of the present invention relates to a method and apparatus for managing virtual memory addresses.

BACKGROUND

A conventional virtual machine manager (VMM) may run on a computer to present the abstraction of one or more virtual machines (VMs) or guests to other software. Each VM may function as a self-contained platform that runs its own software stack, including an operating system (OS) and applications. Collectively this software stack is referred to as "guest software." Guest software running on a VM expects to operate as if it were running on a dedicated computer. For example, the guest software expects to control various computer operations and have access to physical (i.e., hardware) resources during these operations. The physical resources may include processor-resident resources, such as control registers, resources that reside in memory, such as descriptor tables, and devices on the hosting hardware platform, such as IO devices. In a VM environment, the VMM has ultimate control over the hardware resources. In order to provide protection from and between VMs, the VMM typically virtualizes hardware resources. This may include intercepting and arbitrating accesses to hardware resources made by the guest software.

Virtualization of hardware resources requires frequent virtualization intercepts of access requests from the guest software to provide host emulation of guest instructions that access virtualized processor and platform resources. Virtualization intercepts frequently require guest software switches, which cause an address space switch from the guest space to the host space or an address space switch from guest space to another guest space. A table in the processor called the translation look-aside buffer (TLB) may be used to store information about pages in memory the processor has accessed. The TLB cross-references a program's virtual memory address with its corresponding physical memory address. The TLB enables faster computing by allowing address processing to take place independent of the normal address-translation pipeline. During virtualization however, the TLB needs to be flushed during context switches between VMs as each VM may have entries in the TLB that may conflict with entries corresponding to other VMs. TLB flushes are a major source of guest software switch overhead as they add significant warm-up costs for caching guest virtual address to host physical address translation after guest space switch.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
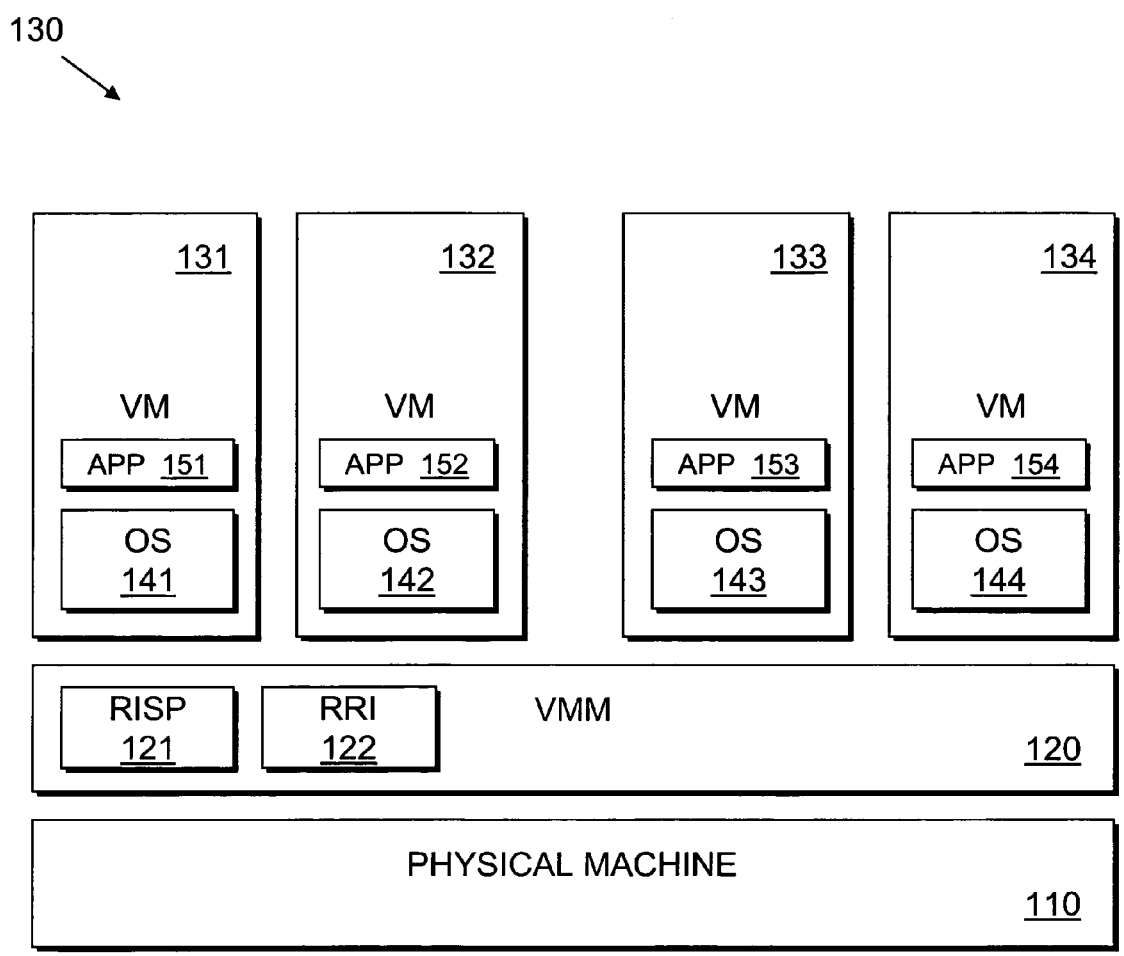
FIG. 1 is a block diagram that illustrates components of a system in which an embodiment of the invention resides.

FIG. 1 is a block diagram that illustrates components of a system 100 in which an embodiment of the invention resides. The system includes a physical machine 110. According to one embodiment, the physical machine 110 may include components of a computer system. The computer system may include, for example, one or more processors, a memory, buses, and various IO devices.

Figure 2:
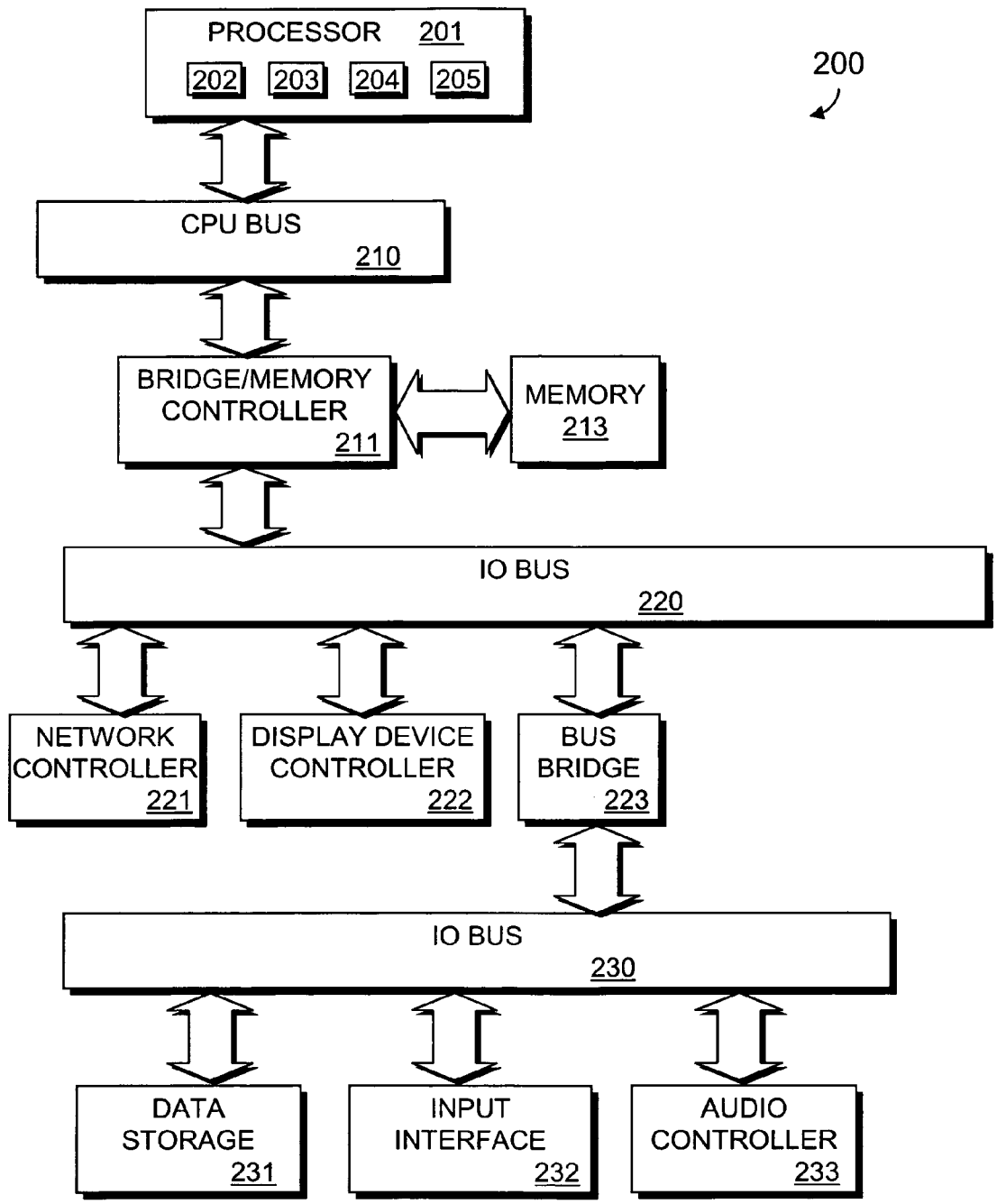
FIG. 2 illustrates an embodiment of the physical machine according to an embodiment of the present invention.

FIG. 2 is a block diagram of an exemplary computer system 200 according to an embodiment of the present invention. The computer system 200 may be used to implement the physical machine 110 shown in FIG. 1. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors. Additionally, each of the one or more processors may support one or more hardware threads. The processor 201 is coupled to a CPU bus 210 that transmits data signals between processor 201 and other components in the computer system 200.

The processor 201 includes region registers 202. The region registers 202 are associated with virtual regions. According to an embodiment of the computer system, a 64-bit address space is divided into eight virtual regions. Each region register includes a region identifier (ID) field to store a value for a region ID associated with a virtual region. According to an embodiment of the present invention, a portion of the region ID field may also be used to store a value for a guest identifier (ID) that identifies a guest or virtual machine (VM) associated with the virtual region. An operating system may access the region registers to assign region IDs to applications using the virtual regions. According to an embodiment of the present invention, a virtual machine monitor (VMM) may also access the region registers to assign guest IDs to VMs associated with the virtual regions.

The processor 201 includes a processor status register 203. The processor status register 203 includes a VM bit that may be set to indicate whether the region registers 202 may be accessed. According to an embodiment of the computer system 200, the VM bit is set such that an execution of instructions to read or write on the region registers 202 originating from a VM generates a virtualization intercept to a VMM.

The processor 201 includes a memory management unit 204. The memory management unit 204 manages a virtual memory in the computer system 100. The memory management unit 204 includes a translation look-aside buffer (TLB). The TLB may be used to store information about pages in memory the processor has accessed. The TLB cross-references a program's virtual memory address with its corresponding physical memory address. According to an embodiment of the present invention, the TLB stores virtual and physical memory address information associated with applications from more than one VM. The TLB utilizes guest IDs to differentiate the virtual and physical address information from a plurality of VMs. In this embodiment, the TLB need not be flushed during a context switch between VMs.

The processor 201 includes an address translator 205. The address translator 205 retrieves a physical memory address corresponding to a virtual memory address utilizing a guest ID associated with a VM accessing the virtual memory address.

The computer system 200 includes a memory 213. The memory 213 may be a dynamic random access memory device, a static random access memory device, read-only memory, and/or other memory device. The memory 213 may store instructions and code represented by data signals that may be executed by the processor 201. A cache memory may reside inside processor 201 that stores data signals stored in memory 213. The cache speeds access to memory by the processor 201 by taking advantage of its locality of access. In an alternate embodiment of the computer system 200, the cache resides external to the processor 201. A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first IO bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. An audio controller 233 is coupled to the second IO bus 230. The audio controller 233 operates to coordinate the recording and playing of sounds and is also coupled to the IO bus 230. A bus bridge 223 couples the first IO bus 220 to the second IO bus 230. The bus bridge 223 operates to buffer and bridge data signals between the first IO bus 220 and the second IO bus 230.

It should be appreciated that computer systems having a different architecture may also be used to implement the physical machine 110. For example, in an embodiment, the display device controller 222 may be attached to a different IO bus. In another embodiment, the memory controller 211 may be integrated onto the processor 201.

Referring back to FIG. 1, the system 100 includes a VMM 120. The VMM 120 is a layer that interfaces the physical machine 110 and that facilitates one or more VMs 130 to be run. According to an embodiment of the present invention, the VMM 120 may be a sequence of instructions stored in a memory of a computer system. The VMM 120 manages and mediates computer system resources in the physical machine 110 between the VMs 130 and allows the isolation of or data sharing between VMs 130. The VMM 120 achieves this isolation or sharing by virtualizing resources in the physical machine 110 and exporting a virtual hardware interface (i.e., a VM) that could reflect an underlying architecture of the physical machine 110, a variant of the physical machine, or an entirely different physical machine.

The system 100 includes one or more VMs 131-134 (collectively shown as 130). According to an embodiment of the present invention, a VM may be described as an isolated model of a machine including, but not limited to, a replica of the physical machine, a subset of the physical machine, or model of an entirely different machine. A VM may include the resources of the computer system in the physical machine 110, a subset of the resources of the computer system in the physical machine 110, or entirely virtual resources not found in the physical machine.

According to an embodiment of the present invention, the VMM 120 has control of the physical machine 110 and creates VMs 130, each of which behaves like a physical machine that can run its own operating system (OS). VMs 131-134 may run operating systems (guest operating systems) 141-144 respectively where the operating systems 141-144 may be unique to one another. To maximize performance, the VMM 120 allows a VM to execute directly on the resources of the computer system in the physical machine 110 when possible. The VMM 120 takes control, however, whenever a VM attempts to perform an operation that may affect the operation of other VMs, the VMM 120 or of the operation of resources in the physical machine 110. The VMM 120 emulates the operation and may return control to the VM when the operation is completed. One or more applications (guest applications) may be run on each of the VMs 131-134. As shown in this example, applications (APPs) 151-154 are run on VMs 131-134, respectively.

The VMM 120 includes a region ID size presenter (RISP) 121. The region ID size presenter 121 intercepts calls made from operating systems on VMs to return a size of a region ID supported by the system 100. The region ID size presenter 121 returns a value smaller than a size supported by the system 100. According to an embodiment of the VMM 120, the region ID size presenter 121 may protect an entry point of a Processor Abstraction Layer through page protection mechanisms or provide a dummy or substitute Processor Abstraction Layer firmware to guest operating systems to cause a virtualization intercept. By returning a value smaller than a size supported by the system 100, the VMM 120 is able to hide and reserve bits in a region ID field of a region register to create a guest ID.

According to an embodiment of the system 100, the 64-bit address space is divided into eight $2^{61}$ byte virtual regions. A virtual region may be selected by the upper 3-bits of a virtual memory address. It should be appreciated that the address space may be any bit length and that the address space may be divided into any number of virtual regions. Associated with each virtual region is a region register that specifies a region ID for the virtual region. By assigning a unique region ID per process, the guest operating system allows for the translations of virtual memory addresses to physical memory addresses of different processes to be stored in a TLB as well as in a virtual hash page table. This removes the need of flushing the TLB and/or the virtual hash page table upon context switches within a VM.

The VMM 120 includes a region register interface (RRI) 122. The region register interface 122 intercepts guest accesses to region registers from operating systems 141-144. According to an embodiment of the VMM 120, intercepts are performed upon determining that a VM bit in a processor status register is set. The region register interface 122 may merge guest IDs of VMs associated with virtual regions with region IDs on guest writes onto the region registers. The region register interface 122 may mask off guest IDs of VMs associated with virtual regions on guest reads from the region registers.

Though the VMM 120 uses higher order bits in the region ID as guest ID, guest software can continue to utilize the lower order bits in its process switch optimization. The insertion of the guest ID is done by the VMM 120 through interception and emulation of the instructions which read and write the region registers. This allows the procedure to be transparent to applications run on VMs.

Figure 3:
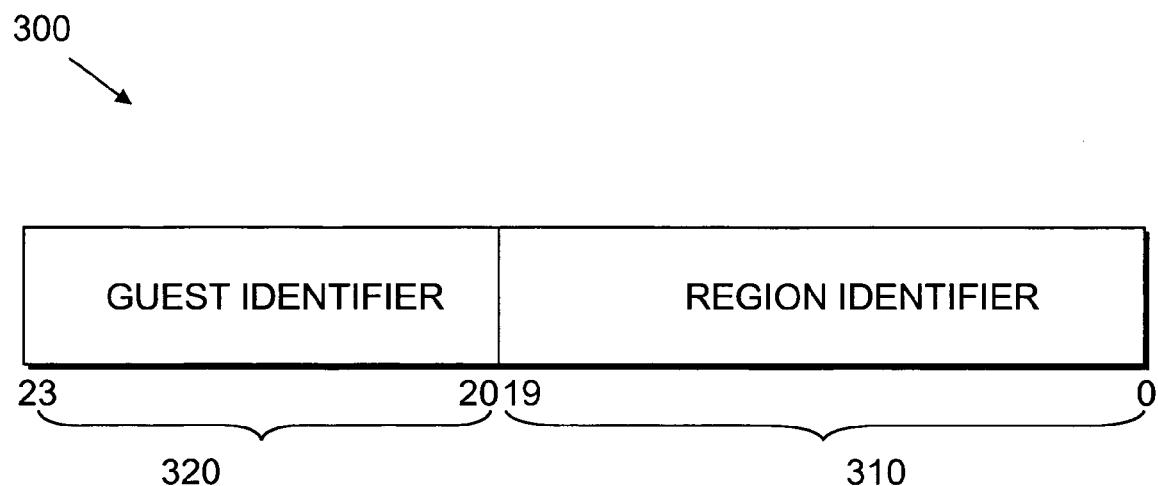
FIG. 3 illustrates a region ID field in a region register according to an embodiment of the present invention.

FIG. 3 illustrates a region ID field 300 in a region register according to an embodiment of the present invention. The region ID field 300 may be implemented in one of the region registers 202 shown in FIG. 2. The region ID field 300 includes a first plurality of bits 310 allocated for storing a region ID. The region ID identifies a region in memory associated with an application run by a VM. The region ID field 300 includes a second plurality of bits 320 allocated for storing a guest ID. The guest ID identifies a guest (VM) that runs the process. In the embodiment shown, a first plurality of lower bits (0-19) are used for storing a region ID and a second plurality of higher bits (20-23) are used for storing a guest ID. It should be appreciated that the number of bits allocated for the guest ID may depend on VMM optimization policy. This may be determined by taking into account the number of the implemented bits available in a region ID field 300 on a particular processor implementation and the likely number of instances of guest software that may be run simultaneously.

Figure 4:
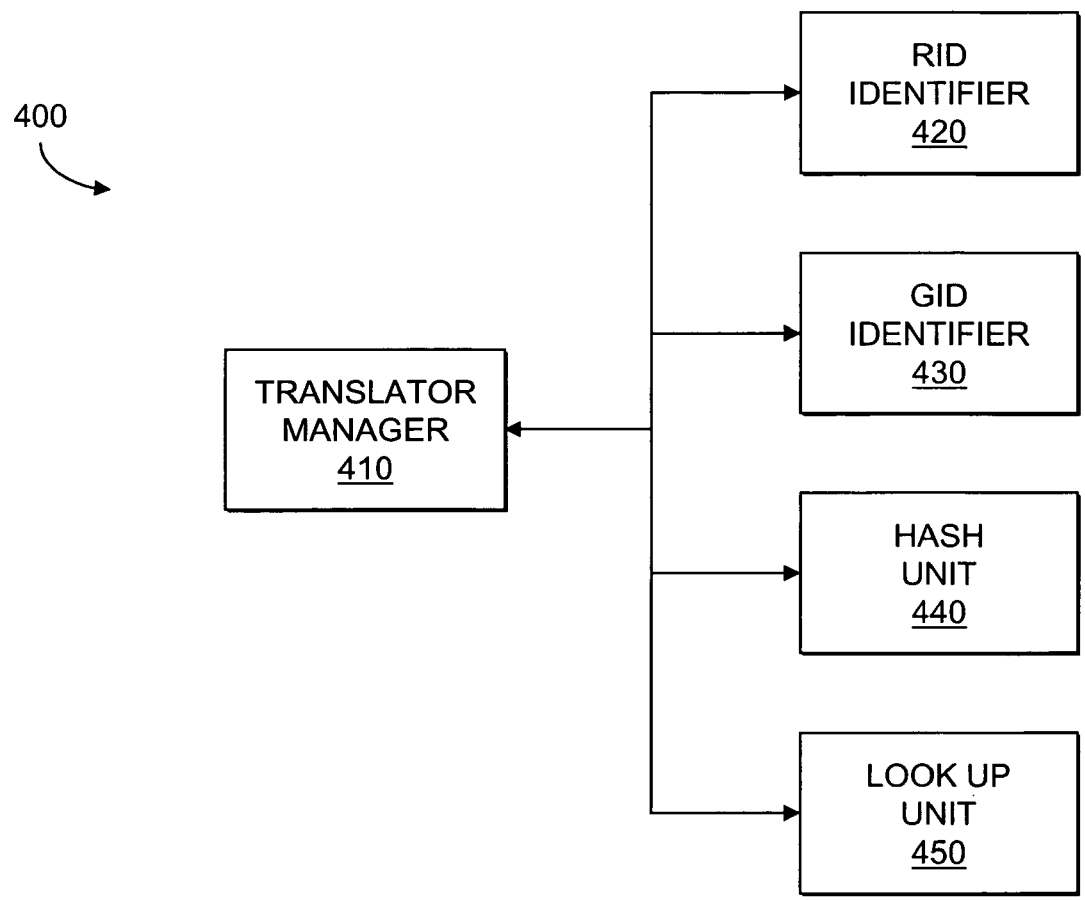
FIG. 4 is a block diagram of an address translator according to an embodiment of the present invention.

FIG. 4 is a block diagram of an address translator 400 according to an embodiment of the present invention. The address translator 400 receives virtual memory addresses from applications running on VMs. The address translator 400 retrieves physical memory addresses associated with the virtual memory addresses. The address translator 400 may be used to implement the address translator 205 shown in FIG. 2. The address translator 400 includes a translator manager 410. The translator manager 410 interfaces with and transmits information between other components in the address translator 400.

The address translator 400 includes a region ID (RID) identifier 420. The region ID identifier 420 identifies a region ID that corresponds to a virtual region associated with a virtual memory address. According to an embodiment of the address translator 400, the region ID identifier 420 uses a virtual region number in the virtual memory address to identify a virtual region. A first portion of the bits in a region ID field in a region register corresponding to the virtual region is read to determine the region ID.

The address translator 400 includes a guest ID (GID) identifier 430. According to an embodiment of the address translator 400, a second portion of bits in the region ID field in the region register corresponding to the virtual region identified by the region ID identifier 420 is read by the guest ID identifier 430 to determine the guest ID.

The address translator 400 includes a hash unit 440. The hash unit 440 performs a hash function on the region ID and the guest ID associated with the virtual memory address and a virtual page number in the virtual memory address to generate a hash value.

The address translator 400 includes a look up unit 450. The look up unit 450 retrieves a physical memory address in a table in a TLB indexed by the hash value generated by the hash unit 440. According to an embodiment of the look up unit 450, a TLB entry indexed by the hash value is tested to determine if it has a matching region ID and guest ID value. If a matching region ID and guest ID value exists, a physical address is retrieved. If a matching region ID and guest ID value does not exist, a TLB miss is generated.

Figure 5:
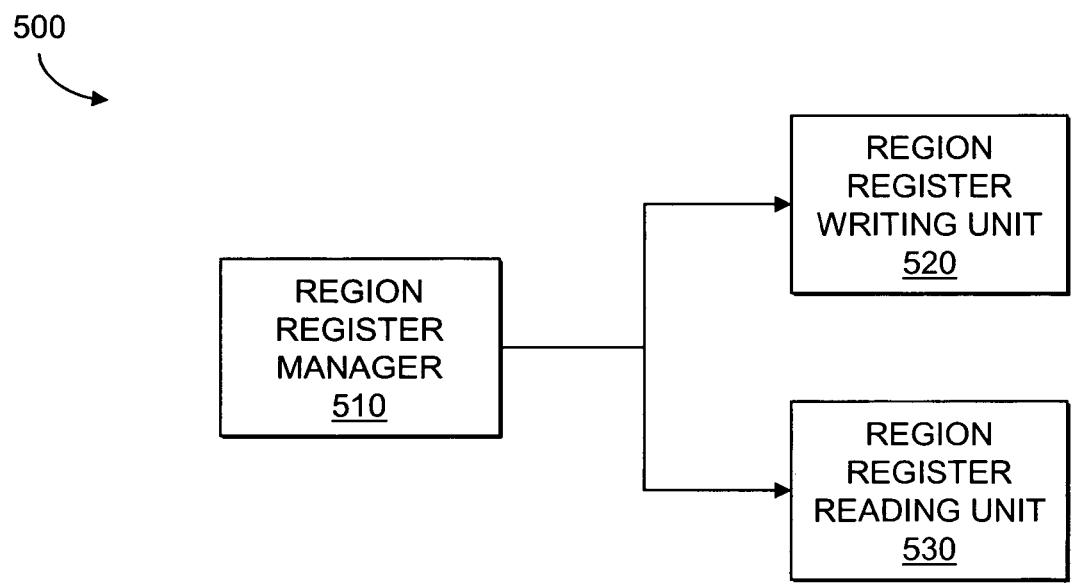
FIG. 5 is a block diagram of a region register interface according to an embodiment of the present invention.

FIG. 5 is a block diagram of a region register interface 500 according to an embodiment of the present invention. The region register interface 500 may be implemented as the region register interface 122 shown in FIG. 1. The region register interface 500 includes a region register manager 510. The region register manager 510 interfaces with and transmits information between other components in the region register interface 500. The region register manager 510 intercepts accesses made from guest operating systems to region registers that control region identifiers. According to an embodiment of the region register interface 500, the region register manager 510 detects virtualization intercepts delivered to virtualization vectors in a host interruption vector table.

The region register interface 500 includes a region register writing unit 520. The region register writing unit 520 identifies a guest ID associated with a VM of a guest operating system requesting to write a region ID to a region register. The region register writing unit 520 merges the guest ID and a region ID specified by the guest operating system and writes the merged value into the target region register.

The region register interface 500 includes a region register reading unit 530. Upon receiving a request to read a region register from a guest operating system, the region register reading unit 530 retrieves the value stored in the region register and masks off a plurality of bits designated for a guest ID. The region register reading unit 530 returns the region ID to the guest operating system.

Figure 6:
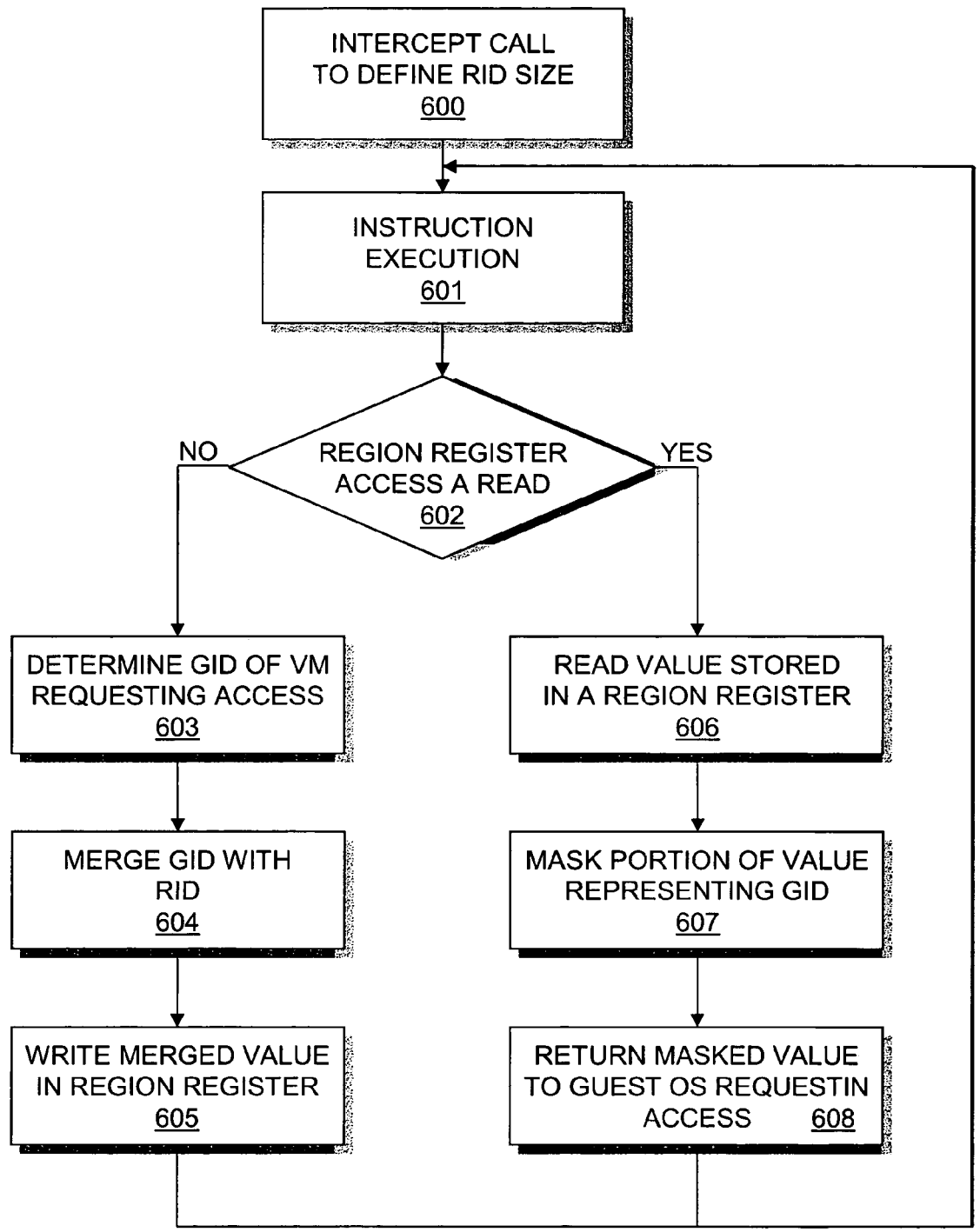
FIG. 6 is a flow chart of a method for managing a region register according to an embodiment of the present invention.

FIG. 6 is a flow chart of a method for managing a region register according to an embodiment of the present invention. At 600, a call to define a register ID size is intercepted. The call may be made by a guest operating system running on a VM to firmware on a system. Intercepting the call may be achieved, for example, by protecting an entry point of the Processor Abstraction Layer or alternatively by providing a dummy Protection Abstraction Layer firmware to the guest operating system. The value returned to the guest operating system is a number of bits smaller than which is implemented and supported by the region registers in the system.

At 601, an instruction is executed.

At 602, it is determined whether a request to access a region register access is a region register read. If the request to access is not a request to read, control proceeds to 603. If the request to access is a request to read, control proceeds to 606.

At 603, the guest ID associated with a VM of a guest operating system originating the request is determined. According to an embodiment of the present invention, this may be achieved by reading a portion of the region register designated for storing a guest ID or reading a portion of a value stored in the region register designated as the guest ID. A VMM may also keep track of a guest ID associated with a VM of a current active guest operating system by storing it to a VMM memory region or to a control register. As the region register value should include the guest ID, alternatively VMM can also perform a read-modify-and-write operation on a region register by preserving the portion of the region register value which represents the guest ID value.

At 604, the guest ID is merged with the region ID specified by the guest operating system. According to an embodiment of the present invention, the region ID is designated to the lower value bits and the guest ID is designated to higher value bits.

At 605, the merged value is written to the target region register. Control returns to 601.

At 606, a value is read from the target region register.

At 607, bits representing the guest ID are masked.

At 608, the masked value is returned to the guest operating system requesting access to the region register. Control returns to 601.

Figure 7:
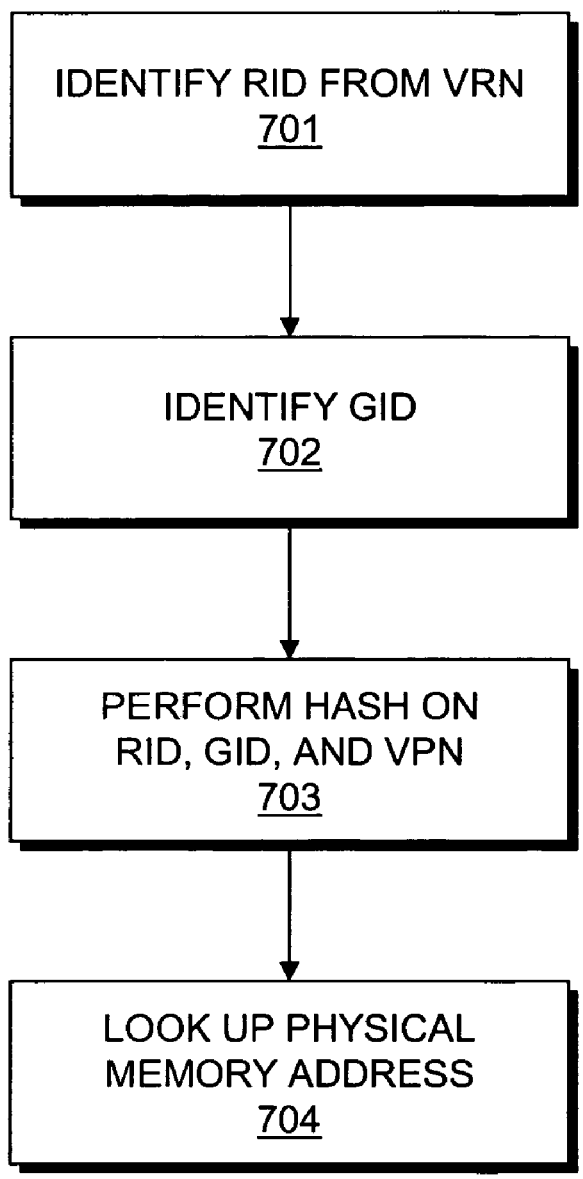
FIG. 7 is a flow chart of a method for translating a virtual memory address according to an embodiment of the present invention.

FIG. 7 is a flow chart of a method for translating a virtual memory address according to an embodiment of the present invention. At 701, a region ID is identified from a virtual region number. According to an embodiment of the present invention, the region ID is identified by reading a region register associated with a virtual region corresponding to the virtual region number in the virtual memory address.

At 702, a guest ID is identified. According to an embodiment of the present invention, the guest ID is identified by reading the guest ID from a region register associated with the virtual region corresponding to the virtual region number in the virtual memory address.

At 703, a hash function is performed on the region ID, guest ID, and virtual page number on the virtual memory address to generate a hash value.

At 704, the hash value is used to reference the physical memory address on a hash table. The hash table may reside in a TLB.

Embodiments of the present invention improve memory management. Specifically embodiments of the present invention improve the performance of virtual memory address to physical memory address translation. By hiding and reserving higher order bits in region registers designated for region IDs and enabling the higher order bits as guest IDs, usage of the TLB in a processor and a virtual hash page table in memory may be improved. Assigning unique guest IDs to guest spaces used by guest processes in memory allows a VMM to mix the translations from different instances of guest operating systems in the TLB and the VHPT. Expensive TLB and VHPT flush operations may be avoided upon context switches from applications from one VM to applications from another VM.

FIGS. 6 and 7 are flow charts illustrating methods according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Although embodiments of the present invention have been described with using higher order bits in the region register to create a guest ID, it should be appreciated that a different order bit location may be chosen to create the guest ID. It should also be appreciated that a processor may natively provide an architecturally separate bit field for supporting a guest ID in a region register or a separate register for the guest ID, thus eliminating the need to intercept and emulate guest instructions to read and write on the region registers. Procedures and components described with reference to the VMM may also be implemented outside the VMM. For example, the region register interface 500 (shown in FIG. 5) may be implemented in a firmware layer.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for managing virtual memory addresses, comprising:
    associating a guest identifier (ID) with a virtual machine (VM) accessing a virtual memory address;
    retrieving a physical memory address by referencing an entry on a table associated with the guest ID; and
    intercepting a call to return a size of a region ID and to return a value smaller than a supported size, wherein intercepting the call includes protecting an entry point of a Protection Abstraction Layer.

2. The method of claim 1, wherein retrieving the physical memory address comprises referencing the entry on the table associated with the guest ID, a region ID, and a virtual page number associated with the virtual memory address.

3. The method of claim 2, wherein the table resides in a translation look-aside buffer (TLB).

4. The method of claim 1, further comprising determining a region ID assigned to a virtual region corresponding to a virtual region number in the virtual memory address.

5. The method of claim 4, wherein determining the region ID comprises reading a region register associated with a virtual region corresponding to the virtual region number.

6. The method of claim 1, further comprising reading the guest ID from a region register associated with a virtual region corresponding to a virtual region number in the virtual memory address.

7. A machine readable medium capable of storing sequences of instructions, the sequences of instructions including instructions which when executed cause the machine to perform:
- associating a guest identifier (ID) with a virtual machine (VM) accessing a virtual memory address;
- retrieving a physical memory address by referencing an entry on a table associated with the guest ID; and
- intercepting a call to return a size of a region ID and to return a value smaller than a supported size, wherein intercepting the call includes protecting an entry point of a Protection Abstraction Layer.

8. A computer system, comprising:
- a bus;
- a memory; and
- a processor implementing an address translator to retrieve a physical memory address by referencing an entry on a table associated with a guest identifier (ID) associated with a virtual machine accessing the virtual memory address, wherein the processor further implements a region ID size identifier to intercept a call to return a size of a region ID and to return a value smaller than a supported size, wherein intercepting the call includes protecting an entry point of a Protection Abstraction Layer.

9. The computer system of claim 8, wherein the address translator comprises a region ID identifier to identify a region ID associated with a virtual region number.

10. The computer system of claim 8, wherein the address translator comprises a guest ID identifier to identify the guest ID associated with the virtual machine.

11. The computer system of claim 8, wherein the translator comprises a look up unit to identify the physical memory address associated with the guest ID, a region ID, and a virtual page number.

12. The computer system of claim 8, wherein the processor comprises a virtual machine bit that may be set to indicate whether a region register may be accessed.

13. The computer system of claim 8, wherein the processor comprises a plurality of region registers to store guest IDs and region IDs associated with virtual memory addresses.

14. The computer system of claim 8, wherein the processor comprises a translation look-aside buffer (TLB) to store physical addresses corresponding to virtual memory addresses associated with more than one virtual machine.

15. A method for managing virtual memory addresses, comprising:
- associating a guest identifier (ID) with a virtual machine (VM) accessing a virtual memory address;
- retrieving a physical memory address by referencing an entry on a table associated with the guest ID; and
- intercepting a call to return a size of a region ID and to return a value smaller than a supported size, wherein intercepting the call includes providing a substitute Protection Abstraction Layer firmware.

16. The method of claim 15, wherein retrieving the physical memory address comprises referencing the entry on the table associated with the guest ID, a region ID, and a virtual page number associated with the virtual memory address.

17. The method of claim 15, wherein the table resides in a translation look-aside buffer (TLB).

18. The method of claim 15, further comprising determining a region ID assigned to a virtual region corresponding to a virtual region number in the virtual memory address.

19. The method of claim 18, wherein determining the region ID comprises reading a region register associated with a virtual region corresponding to the virtual region number.

20. The method of claim 15, further comprising reading the guest ID from a region register associated with a virtual region corresponding to a virtual region number in the virtual memory address.

21. A machine readable medium capable of storing sequences of instructions, the sequences of instructions including instructions which when executed cause the machine to perform:
- associating a guest identifier (ID) with a virtual machine (VM) accessing a virtual memory address;
- retrieving a physical memory address by referencing an entry on a table associated with the guest ID; and
- intercepting a call to return a size of a region ID and to return a value smaller than a supported size, wherein intercepting the call includes providing a substitute Protection Abstraction Layer firmware.

22. A computer system, comprising:
- a bus;
- a memory; and
- a processor implementing an address translator to retrieve a physical memory address by referencing an entry on a table associated with a guest identifier (ID) associated with a virtual machine accessing the virtual memory address, wherein the processor further implements a region ID size identifier to intercept a call to return a size of a region ID and to return a value smaller than a supported size, wherein intercepting the call includes providing a substitute Protection Abstraction Layer firmware.

23. The computer system of claim 22, wherein the address translator comprises a region ID identifier to identify a region ID associated with a virtual region number.

24. The computer system of claim 22, wherein the address translator comprises a guest ID identifier to identify the guest ID associated with the virtual machine.

25. The computer system of claim 22, wherein the translator comprises a look up unit to identify the physical memory address associated with the guest ID, a region ID, and a virtual page number.

26. The computer system of claim 22, wherein the processor comprises a virtual machine bit that may be set to indicate whether a region register may be accessed.

27. The computer system of claim 22, wherein the processor comprises a plurality of region registers to store guest IDs and region IDs associated with virtual memory addresses.

28. The computer system of claim 22, wherein the processor comprises a translation look-aside buffer (TLB) to store physical addresses corresponding to virtual memory addresses associated with more than one virtual machine.

* * * * *

UNITED STATES PATENT AND TRADEMARK OFFICE
CERTIFICATE OF CORRECTION

PATENT NO.        : 7,383,374 B2
APPLICATION NO. : 11/096175
DATED             : June 3, 2008
INVENTOR(S)       : Yamada et al.

It is certified that error appears in the above-identified patent and that said Letters Patent is hereby corrected as shown below:

On the title page, Item (75), in "Inventors", line 2, delete "San Jose," and insert -- Sunnyvale, --, therefor.

On Sheet 6 of 7, in FIG. 6 (Reference Numeral 608), line 2, delete "REQUESTIN" and insert -- REQUESTING --, therefor.

Signed and Sealed this

Eighth Day of September, 2009

David J. Kappos
*Director of the United States Patent and Trademark Office*